United States Patent [19]

Okashima et al.

[11] Patent Number: 5,280,508
[45] Date of Patent: Jan. 18, 1994

[54] PARTIAL LENGTH ROD UPPER END PLUG AND GRAPPLES THEREFOR

[75] Inventors: Bob Y. Okashima; Gary I. Borchardt, both of San Jose; Peter A. Peterson, San Ramon; Russell P. Higgins, San Jose, all of Calif.

[73] Assignee: General Eectric Company, San Jose, Calif.

[21] Appl. No.: 18,476

[22] Filed: Feb. 16, 1993

Related U.S. Application Data

[63] Continuation of Ser. No. 702,657, May 17, 1991, abandoned.

[51] Int. Cl.$^5$ .................. G21C 3/10; G21C 19/10
[52] U.S. Cl. .................... 376/261; 376/271; 376/451
[58] Field of Search .............. 376/261, 262, 264, 268, 376/271, 435, 451; 294/906

[56] References Cited

U.S. PATENT DOCUMENTS

| 4,202,727 | 5/1980 | Batjukov et al. | 376/264 |
|---|---|---|---|
| 4,297,776 | 11/1981 | Fogg | 376/261 |
| 4,374,801 | 2/1983 | Albin | 376/271 |
| 4,539,174 | 9/1985 | Patenaude | 376/261 |
| 4,715,111 | 12/1987 | Kapoor et al. | 376/271 |
| 5,112,570 | 5/1992 | Dix et al. | 376/435 |

FOREIGN PATENT DOCUMENTS

| 0017508 | 10/1980 | European Pat. Off. | 376/261 |
|---|---|---|---|
| 0109902 | 5/1984 | European Pat. Off. | |
| 0336203 | 10/1989 | European Pat. Off. | 376/370 |
| 218996 | 12/1984 | Japan | 376/261 |
| 1596787 | 8/1981 | United Kingdom | |

Primary Examiner—Daniel D. Wasil
Attorney, Agent, or Firm—John S. Beulick

[57] ABSTRACT

A part length fuel rod tip and group of tip grasping tools is set forth for the removal, inspection and replacement of part length fuel rods from a fuel bundle having a part length rods interspersed with a majority of conventional full length rods. The part length fuel rod tip includes a longitudinal keyway allowing torque to be exerted on the fuel rod and a horizontal slot enabling grasping of the fuel rod for vertical withdrawal and replacement movement of the fuel rod. The tools include a torque socket for applying high torque forces to the part length rod for unscrewing the rod when the rod becomes stuck at its threaded connection to the lower tie plate, a tip grasping tool for permitting normal unscrewing torque and grasping for vertical withdrawal and replacement, and finally a tool having both high torque and grasping characteristics. In each case, the diameter of the tools is restricted to enable access to the part length fuel rods through the spacers overlying the upwardly exposed ends of the part length fuel rods.

2 Claims, 5 Drawing Sheets

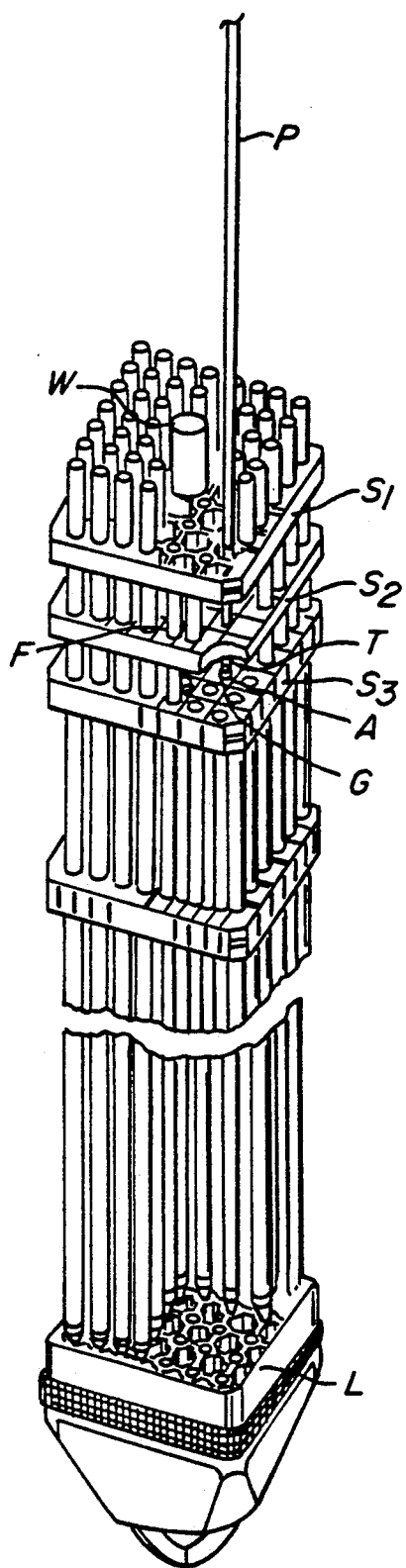
FIG. 3.
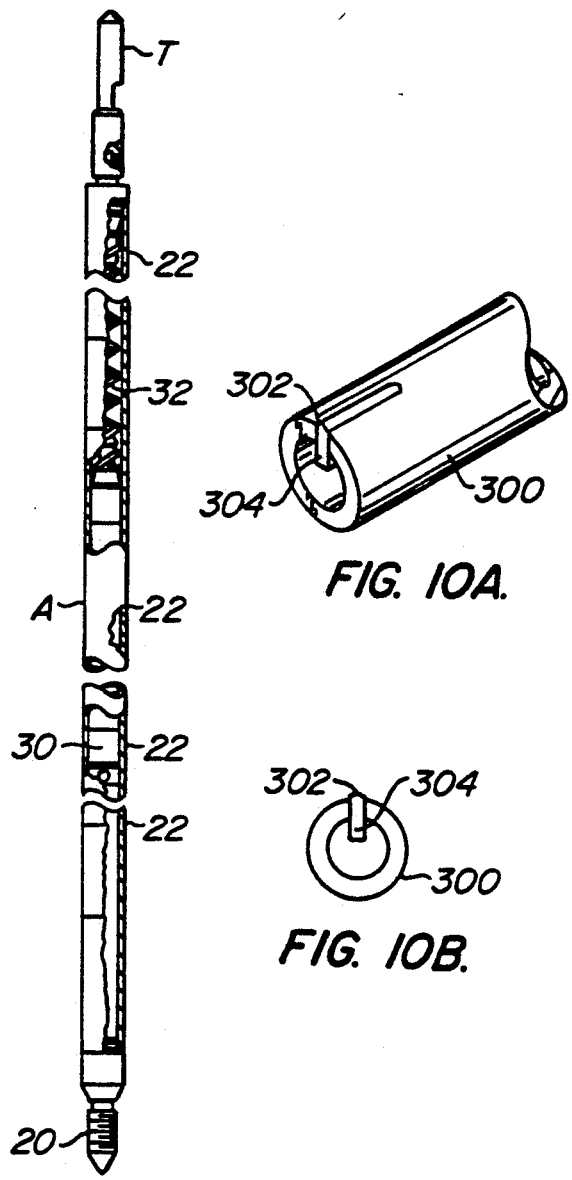
FIG. 4A.
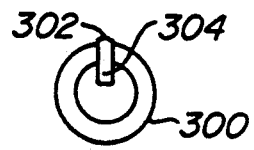
FIG. 10A.
FIG. 10B.

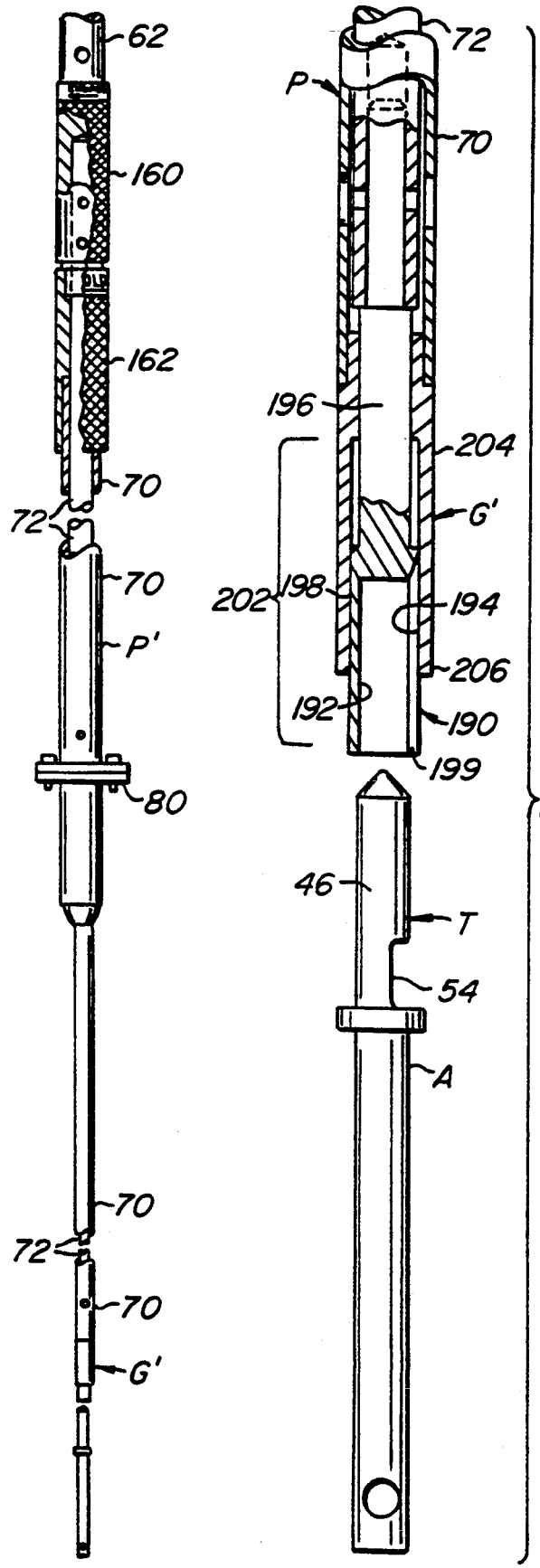
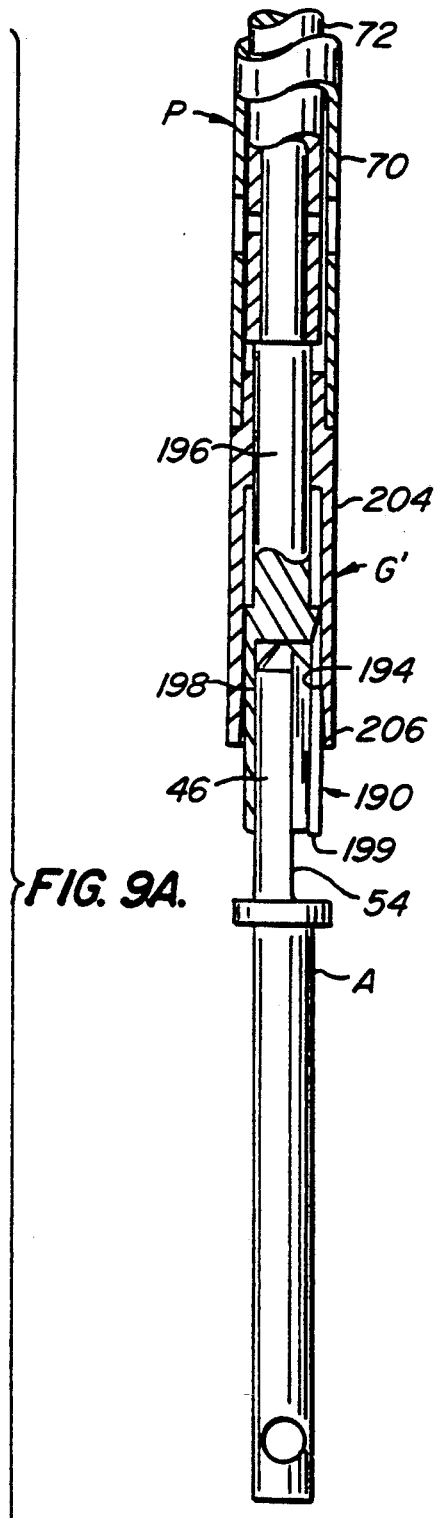
FIG. 8.
FIG. 9A.
FIG. 9B.

PARTIAL LENGTH ROD UPPER END PLUG AND GRAPPLES THEREFOR

This is a continuation of application Ser. No. 07/702,657, filed May 17, 1991, now abandoned.

This invention relates to the insertion and replacement of fuel rods to fuel bundles. More particularly, and in the case of fuel bundles having part length rods, provision is made for the insertion and replacement of recessed part length rods to enable inspection and or replacement of the part length fuel rods without disturbing or requiring disassembly of the rest of the fuel bundle.

BACKGROUND OF THE INVENTION

In Dix et al. U.S. Pat. No. 5,112,570 entitled Two Phase Pressure Drop Reduction BWR Assembly Design, the concept of partial length rods is disclosed. This concept may best be understood by first understanding the construction of a conventional fuel bundle with conventional fuel rods and thereafter setting forth in summary format the part length rod invention of the above referenced patent, which patent is incorporated by reference in this disclosure.

A conventional boiling water fuel bundle includes a lower tie plate for supporting a matrix of vertically upstanding fuel rods at their lower end and an upper tie plate for holding the same matrix of vertical upstanding sealed fuel rods at their upper end. The lower tie plate permits the inflow of liquid moderator (water) around the fuel rods, the upper tie plate permits the outflow of liquid moderator (water) and generated vapor moderator (steam) at the upper end of the fuel bundle. A channel surrounds the lower tie plate, surrounds the upper tie plate, and defines a confined flow path for the moderator between the upper and lower tie plates about the matrix of upstanding fuel rods. Fluid flow is thus confined between the upper and lower tie plates and isolated from surrounding liquid moderator in the so-called core by pass area immediate adjoined to the fuel channel on the outside of the fuel channel.

The fuel rods within the fuel bundle are flexible and unless otherwise restrained would come into contact with one another under the forces of flow induced vibration and so-called "creep"—a differential growth in the fuel rods resulting from their heated, pressurized and radioactive environment. This being the case, a system of fuel rod spacers is distributed from the top to the bottom of the fuel bundles. These spacers form a matrix of individual cells discretely surrounding each fuel rod at spaced apart elevations within the fuel bundle holding the flexible fuel rods in their designed side-by-side relationship.

During operation of the fuel bundle in a reactor core of a boiling water nuclear reactor, the fuel bundle can be dynamically described as having two regions of operation. These regions include a lower single phase region containing liquid moderator (water) and an upper two phase region containing liquid moderator (water) intermixed with increasing fractions of vapor moderator (steam).

In a boiling water nuclear reactor, the moderator serves two purposes. First, the moderator moderates fast neutrons generated by the reaction into slow or thermal neutrons necessary to continue the reaction.

Secondly, the dense water moderator turns to expanded saturated steam. Energy is extracted from the saturated steam by passing the steam through an engine, such as a steam turbine.

Having set forth the conventional construction and operation of a boiling water nuclear reactor fuel bundle, the concept of part length rods can now be discussed.

In the above reference Dix et al. U.S. Pat. No. 5,112,570, so-called part length rods were disclosed. In short, an invention is set forth in which "a plurality of fuel rods extending from (the) lower tie plate toward the upper tie plate, (the) part length rods terminating within the two phase region of the bundle before reaching the upper tie plate;". The invention makes the point that "at least two of the part length rods (are) separate from one another so as to define in at least two locations in (the) bundle spaced apart and separate vents commencing at the top of said partial length rods and extending to (the) upper tie plate." Specifically, "each of (the) spaced apart vents (is) immediately adjoined by adjacent full length fuel rods."

Usefulness of the invention is set forth. Specifically, an improved fuel to moderator ratio is created in the upper two phase region of the fuel bundle. More importantly, pressure drop reduction in the upper two phase region of the fuel bundle is set forth. This enables greater stability of the fuel bundle and a reactor core including fuel bundles against thermal hydraulic and nuclear, thermal hydraulic instabilities. Additionally, the fuel to moderator ratio is improved, especially in the cold operating state.

The reader will understand at this point that the disclosed part length rods relate to the required spacers in two ways. First, since the part length rods do not extend to the upper tie plate, it is the spacers that hold the part length rods vertically upright at their respective upper ends. Secondly, since the part length rods terminate before the upper tie plate, some of the spacers in the upper two phase region of the fuel bundle overlying the ends of the part length rods. As will hereinafter appear, it is these spacers that constitute an obstacle in the desired removal of the part length rods.

It is common to inspect fuel bundles, and especially the individual fuel rods of fuel bundles during the operational life times of the fuel bundles. Unfortunately, the very presence of the part length rods renders the inspection of the part length rods inherently difficult. A brief understanding of the constraints of such inspections can be helpful.

Inspections of fuel bundle parts are typically made during reactor outages. During such reactor outages, the power output of the reactor is lost. This loss of power outage carries with it a corresponding loss in revenue. Any delay prolonging the reactor outage can be costly—running into lost revenues of well over several hundred thousand dollars per hour!

Accordingly, provision must be made for rapid inspection of all parts of a fuel bundle, including the new part length rods.

Conventional inspection of fuel bundles is typically accomplished in a submerged environment within a so-called "holding pool." The fuel bundle removed from the reactor is placed upright within the holding pool. Thereafter, the channel surrounding the fuel rods and the upper tie plate holding the fuel rods are removed. In the case of the fuel bundle having nothing but full length rods, the individual fuel rods may thereafter be accessed at the exposed top of each fuel rod, individually removed, inspected and replaced. Access to the fuel rods occurs at the top of the fuel rods. Such access is a routine matter.

Unfortunately, part length rods present special problems.

First, the part length rods have a length from the lower tie plate that is less than the full length rods. For example, the typical full length fuel rod is in the order of 160 inches in length; the typical part length fuel rod is in the order of 120 inches in length. In order to reach the part length rod, one has to penetrate a matrix of full length fuel rods. No view of the engagement of the part length rod is possible. All engagement is essentially "blind."

Secondly, since the part length fuel rods do not extend to the upper tie plate, the part length fuel rods are held in their upright position by the spacers. Accordingly, any tool for the removal and replacement of the part length fuel rods can have a diameter dimension no greater than the diameter dimension of the fuel rods being inspected. It is required that the tool for the removal of the part length rods pass through the spacers overlying the part length rods.

Finally, it is required in some applications that the part length rods be fastened against vertical movement to the lower tie plate. This is done by screwing the part length rods into receiving threads on the lower tie plate. Accordingly, the disassembly of such part length rods is correspondingly rendered more complicated. The screw threads stick. The part length fuel rod must be forcibly rotated. Accordingly, there is a need for both a tip on the part length rod and corresponding tools to render the rapid replacement and removal of such part length rods during reactor outages reliable and fast.

SUMMARY OF THE PRIOR ART

In the testing of the concept set forth in Dix et al. U.S. Pat. No. 5,112,570, entitled Two Phase Pressure Drop Reduction BWR Assembly Design, lead test assemblies were utilized having part length rods in certain locations of the fuel bundle. In the case of these lead test assemblies, the part length rods were not secured to the lower tie plate by a threaded connection; the part length rods rested with their weight being utilized to provided the connection to the lower tie plate. These lead test assemblies required the removal of the part length rods for inspection.

In that case, each part length rod was equipped with a cylindrical tip. The cylindrical tip had a female screw driver indentation on the top and was provided with external male threads. Removal of the part length rods from the interior of the fuel bundle occurred by tool having an exterior tube with corresponding female threads and an internal, freely rotating male screw driver. In operation, the idea was to prevent the rotation of the part length rod through engagement of the male screw driver head with threaded engagement of the female threads of the extraction tool with the male threads of the part length rod tip.

This prior art provision for the removal of the part length rods from the lead test assemblies was less than optimum. Considerable difficulty was experience with the registration of the male screw driver fitting of the extraction tool with the female screw driver indentation upwardly exposed from the tip.

Further, threading of the male threads on the tip with the female threads of the tool was also less than optimum. The tool was pendulously suspended from a bridge a considerable distance to the particular part length rod to be remove and inspected. As a result, the female threads of the suspended tube were vertical. The part length rod, however, had been subjected to the forces of rod creep—a non linear differential growth—which often left the protruding threads of the part length rod less than vertical. Threading blind with the particular threads perfectly vertically aligned was difficult. The added complexity of the exposed threads of the part length rods being less than vertical made the part length rod removal task exceeding difficult in many cases.

The reader will realize that the particular apparatus for the removal of the part length rods is prior art. The discovery of the difficulty in the intended removal of the part length rods is not prior art. This difficulty was only discovered when actual removal was attempted and is not known in the art.

SUMMARY OF THE INVENTION

A part length fuel rod tip and group of tip grasping tools is set forth for the removal, inspection and replacement of part length fuel rods from a fuel bundle having a part length rods interspersed with a majority of conventional full length rods. The part length fuel rod tip includes a longitudinal keyway allowing torque to be exerted on the fuel rod and a horizontal slot enabling grasping of the fuel rod for vertical withdrawal and replacement movement of the fuel rod. The tools include a torque socket for applying high torque forces to the part length rod for unscrewing the rod when the rod becomes stuck at its threaded connection to the lower tie plate, a tip grasping tool for permitting normal unscrewing torque and grasping for vertical withdrawal and replacement, and finally a tool having both high torque and grasping characteristics. In each case, the diameter of the tools is restricted to enable access to the part length fuel rods through the spacers overlying the upwardly exposed ends of the part length fuel rods.

OTHER OBJECTS, FEATURES AND ADVANTAGES

It is a first object of this invention to disclose a tip for a part length fuel rod which enables rotation under high torque forces as well as vertical withdrawal, manipulation for inspection, and finally enabling convenient replacement of the part length fuel rod. The tip constitutes a generally solid cylindrical addition to the fuel bundle constructed from the same material as the cladding of the fuel bundle—usually the alloy known as zircaloy. The upper surfaces of the tip are rounded, imparting male gathering surfaces to the upwardly exposed end of the fuel rod. The tip includes at least one longitudinally extending keyway. This keyway enables the tip—and the fuel rod to which it is fixed—to be rotated under forces of high torque. Finally, at a portion of the tip relatively close to the fuel rod, a female cylindrical section is removed from the tip S to define a stop surface. This surface enables the tip to be firmly grasped to assure both rotation under high torque and vertical withdrawal and insertion of the fuel rod.

Referring to the "female cylindrical section" removed from the tip S, it will be understood that those having acquaintance with the mechanical design arts would preferred to use other descriptive terms. This portion of the tip could be referred to as a "horizontal slot", "horizontal keyway", "fly cut notch", and other similar terms. We use the term "female cylindrical section" so that this specification can be geometrically descriptive for the purposes of describing this invention with precision.

An advantage of the disclosed tip is that it does not interfere with the conventional portions of the tip design including provisions for charging the tip with gas under pressure to suppress gas discharge from the fission process occurring within the fuel rod.

Stopping at this point, the reader must remember the circumstances of the required inspection of the part length rods. During the reactor outage, time is of the essence. Further, and due to the fact that the part length rods are radio active and therefore must be handled with relative rapidity under water in a holding pool, manipulation of the following disclosed tools occurs at the end of a long pole within an upright fuel bundle having its channel and upper tie plate removed. Finally, the pole must penetrate into the matrix of full length rods—and water rods—upwardly exposed in the pool. At the bottom of the pole—out of view of the personnel performing the inspection—all manipulation of the part length rod must occur.

An additional object of this invention is to disclose an alternate tool for rotating the part length fuel rod under high torque. According to this aspect of the invention, a female socket is disclosed. The socket include an inside bore having an inside diameter equal to the outside diameter of the part length rod tip. This inside bore includes a protruding key. This key is dimensioned with respect to the bore and spaced with respect to the bore to fit interiorly of the tip keyway. By remote rotation of the tool, remote rotation under high torque can be exerted on the part length rod for unscrewing motion from the lower tie plate.

Another object of this invention is to disclose a general purpose tool for the normal manipulation of a part length rod. According to this aspect of the invention, a female tool member is disclosed having a slit peripheral cylinder defining at least three discrete cylinder segments. The slits in the cylinder defining the cylinder segments are longitudinal and at preferable 120° intervals about the cylinder. This cylinder is given a dimension enabling the cylinder segments to be separated overlying the part length rod tip so as to fit in a snug and slightly expanded relationship over the tip outer surface. A remotely actuated reciprocating sleeve moves to and from a surrounding and embracing relationship over the slit cylinder. When the sleeve is withdrawn from the slit cylinder, insertion and withdrawal of the sleeve from the partial length rod tip can occur. When the sleeve overlies the slit cylinder, locking of the sleeve to the part length fuel rod tip at the outer surface only occurs. In this locked state, normal torque forces as well as vertical forces of withdrawal and insertion can be exerted on the part length fuel rod through the tip.

An additional object of this invention is to disclose a tool which locks to the keyway and cylindrical section of the partial length fuel rod tip. According to this aspect of the invention, a tool is disclosed having a spring biased tang with an attached key and male cylinder segment for fitting to the female cylinder segment of the tip. This tang fits to a tool shaft in a tang slot with the key and male cylinder section spring biased into a tip locking position at that end of the tang remote from the point of attachment to the shaft. A reciprocating sleeve operates over the tang sprung key and male cylinder section. In operation, when the sleeve is withdrawn, the tool may be placed over the tip, rotated until spring biased engagement of the key at the longitudinal keyway occurs, and thereafter advanced onto the tip until the male cylinder segment of the tool engages in and locks to the female cylinder segment in the tip. When the sleeve is advanced overlying the tang, key and male cylinder segment, locking of the tool at the tip occurs enabling rotation under relatively high torque as well as axial replacement and withdrawal of the part length fuel rod. Finally, a ramp is provided at the upward end of the tang attached male cylinder segment to enable climbing of the male cylinder segment of the tool free of the female cylinder segment of the tip to enable tool removal from the tip.

An advantage of the spring biased key is that it permits relative rotation and tactile location of the keyway at the end of the part length rod from the required remote location of personnel inspecting the part length fuel rod.

A further advantage of all disclosed tool constructions is that they can freely pass to and from the part length fuel rod tips without disturbing the surround full length fuel rods or (more importantly) the overlying spacers. As a result, inspection can be conveniently carried out in the short time confines of a reactor outage.

BRIEF DESCRIPTION OF THE DRAWINGS

Other objects, features and advantages of this invention will be more apparent after referring to the following specification and attached drawings in which:

FIG. 3 is a perspective of the fuel bundle in the upright position with some of the fuel rods broken away so that the manipulation of the grapple can be seen relative to the remainder of the fuel rods within the fuel bundle, it being seen that a lower section of the fuel bundle immediately before the tie plate is omitted;

FIG. 4a is a side elevation shown in partial section of a part length fuel rod;

FIG. 8 is a side elevation section of the second and preferred embodiment of the grapple shown in FIG. 1 illustrating the upper end of the tool manipulated above the surface, the flange and joint in the central portion of the tool to enable to the tool to be shipped, and the rod and reciprocating tube at the far end of the tool for manipulating the grapple;

FIG. 9A and 9B are respective perspective views of the grapple and tip with FIG. 9A illustrating the grapple and tip in the act of engagement to the end of the tube and FIG. 9B illustrating grapple and tip engaged with the sleeve locking the assembly in place, it being noted that portions of the sleeve have been broken away for ease of understanding of the drawing; and, FIGS. 10A and 10B are respective elevation illustrating to the torquing tip about to be engaged and finally engage to the part length rod tip of the illustrated invention.

DESCRIPTION OF THE PREFERRED EMBODIMENT

Figures 1, 2:
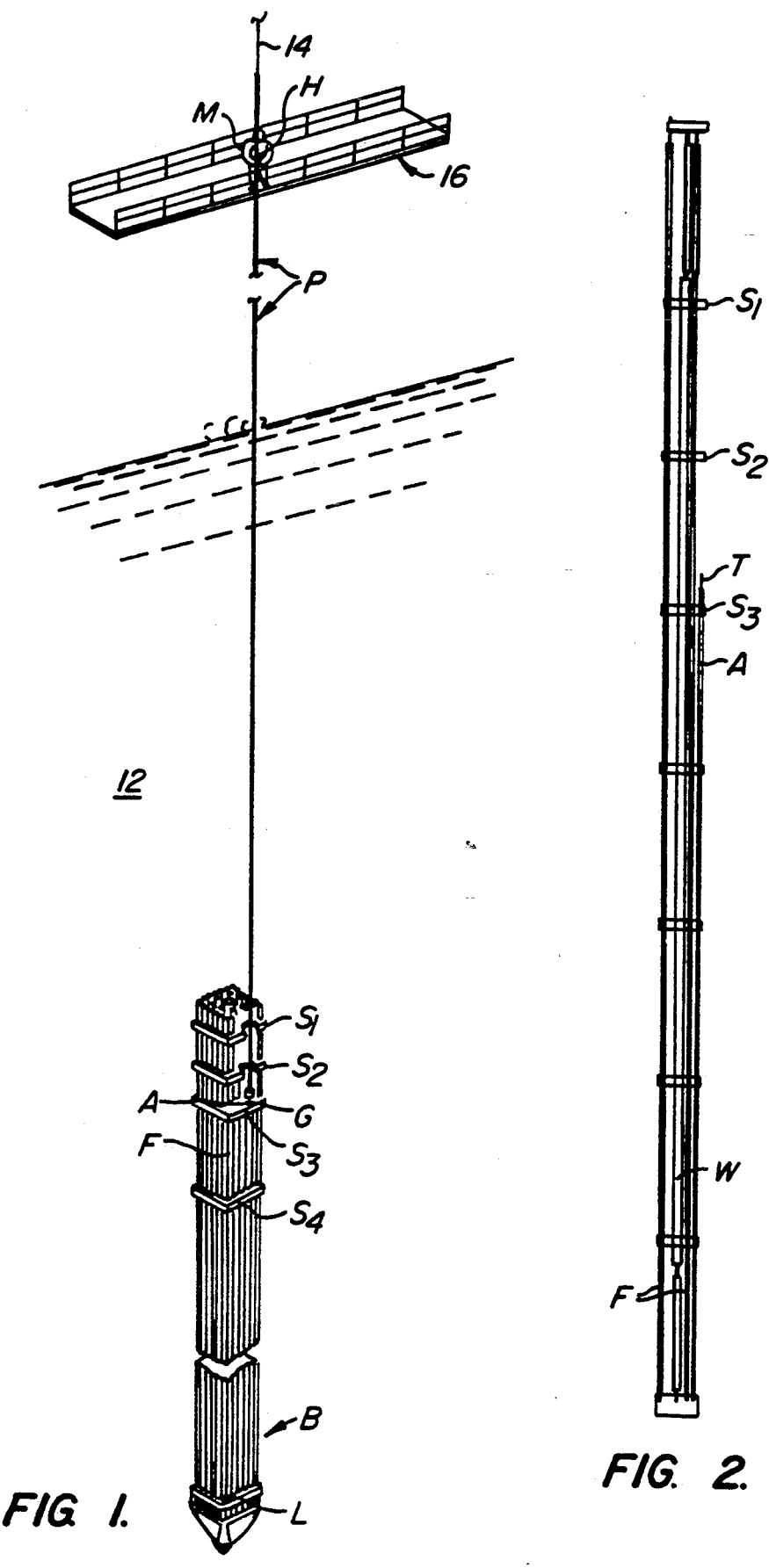
FIG. 1 is a perspective view of a fuel bundle sitting within a pool illustrating workers on a bridge overlying the pool manipulating part length rods into and out of a fuel bundle having partial length rods, the fuel bundle here being shown with the outer channel and upper tie plate removed and the grapple being lowered into the fuel bundle.
FIG. 2 is a side elevation illustrating the relative lengths of the tie rod, full length rod, water rod and part length rod.

Referring to FIG. 1, a fuel bundle B is shown, removed from a reactor. The fuel bundle has been placed in a holding pool 12, and had its lifting handle, channel and upper tie plate removed. As these items are conventional, they are not shown herein. Typically, the bundle is held vertically upright in a fuel handling machine (also conventional and not shown). For the convenience of the reader, the machine is likewise omitted, and the bundle is shown in the upright position.

The worker manipulates handles H. Handles H effect the latching and unlatching of grasping mechanism G. Grasping mechanism G attached to the part length rod A. This grasping of the part length rod A must be made in a matrix of upstanding full length rods F.

Referring to FIGS. 2 and 3, the dimensions of this problem can be understood. Specifically, full length rods F and an interior water rod W are of the order of 160" in length. The part length rod A is approximately 100" in length.

Viewing the schematic of FIG. 2, it can be seen that spacer S1 and spacer S2 overlie the top of part length rod A. Part length rod A is at spacer S3, finally braced in the full upright position. It becomes apparent that access to a tip T at the end of part length rod A must occur through the cell matrix of spacers S1 and S2, overlying tip T.

Referring to FIG. 3, an enlarged perspective of the upstanding fuel bundle is illustrated. A pole P with a grasping tool G at the bottom portion thereof is shown penetrating the matrix of the upstanding fuel bundle, including the lower tie plate L, the full length fuel rods F, a water rod W, to the top of the part length rods A. Part length rods A at spacer S3 as can be seen in order for pole P and grasping tool G to reach tip T of the part length rod A, passage through the cell matrix of spacers S1 and S2 has to occur.

Figure 4B:
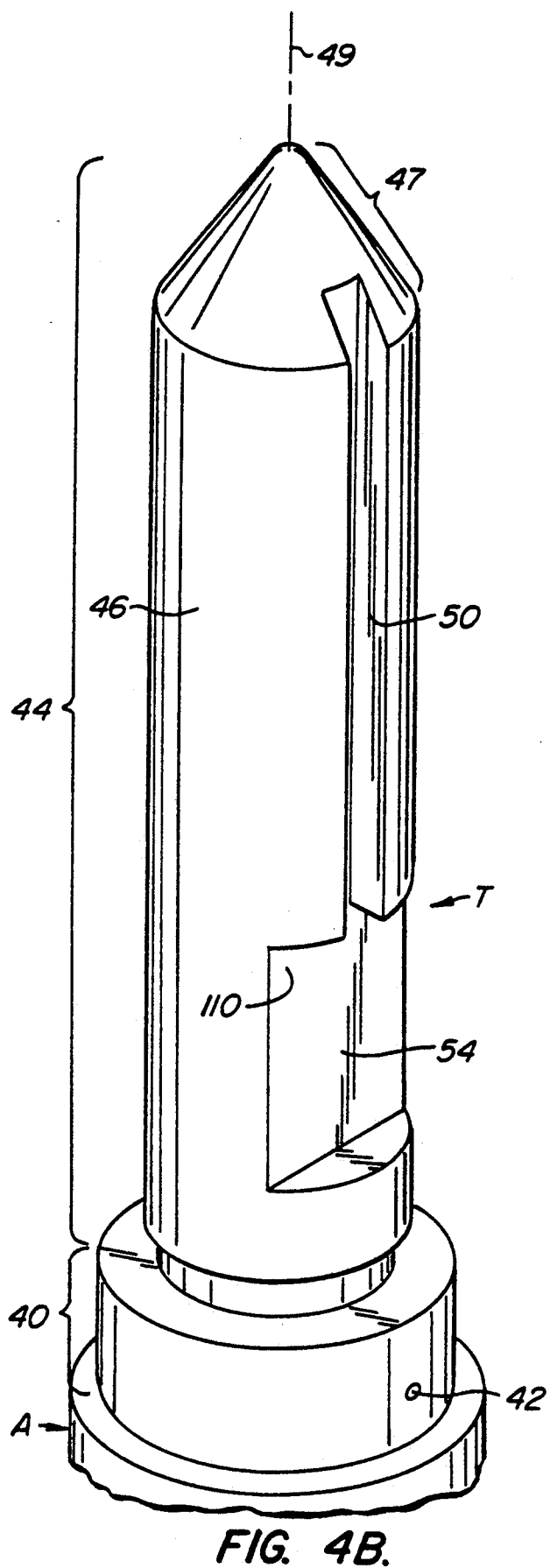
FIG. 4b is an expanded perspective view of the tip of the fuel rod illustrating a longitudinal keyway and a missing cylindrical segment.
Figure 5A:
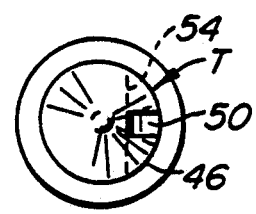
FIG. 5A and 5B are respective side elevation and plan views of the end plug of FIG. 4 illustrating constructional details of the partial length rod end plug.
Figure 5B:
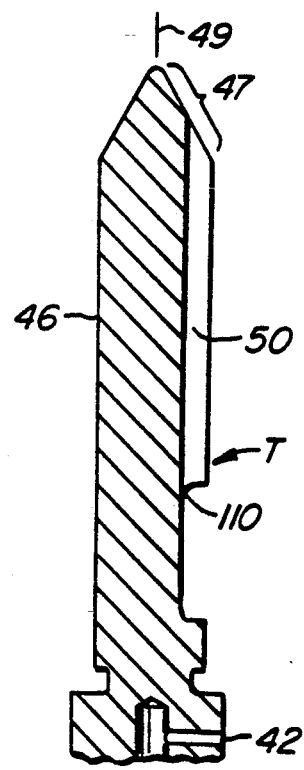

Referring to FIG. 4A, a part length rod A is shown. The part length rod includes a threaded lower tip 20, and attached sealed tube 22, an end tip T. Threaded tip 20 seals tube 22 at one end. Tip T seals the tube at the opposite end. A group of fuel pellets 30 compressed by spring 32 complete the construction of the part length fuel rod.

Viewing the rod A as set forth in FIG. 4A, two important things are worthy of note:

First, in the preferred embodiment of this invention, part length rod A is typically threadedly attached to lower tie plate L. Typically, lower tie plate L defines female threads. The lower threaded tip 20 defines corresponding male threads. To absolutely assure against vertical motion of the part length rod A, the rod is rotated with threaded engagement to lower tie plate L (see FIG. 3).

Secondly, the part length rod includes a tip T. It is this tip T illustrated in more detail in FIG. 4B which constitutes the invention hereof.

Referring to tip T, this tip includes a conventional sealing portion 40, the function of which is known in the prior art and here will be briefly described. Typically, portion 40 seals the end of the tube 22. It has an aperture 42 through which the fuel may be pressurized by gases chosen to suppress fusion gas production during the reactive lifetime of the fuel rod. As this is well known in the prior art, it will not be further discussed herein.

Portion 44 of the tip T constitutes the novel portion of the tip. Consequently, it will now be described in more detail.

First, tip T includes a cylindrical mass 46. This cylindrical mass has three distinctive features.

First, it is provided at the upper end with a rounded gathering surface 47. As will hereinafter be more fully understood, gathering surface 47 enables a tool in a substantially blind condition to be gathered to the tip T for the removal and replacement of the rod.

Secondly, the tip includes a longitudinal keyway 50. Keyway 50 is displaced from the longitudinal axis 49 of the cylindrical mass 46. It functions to provide a surface on tip T through which substantial torque can be applied. Thus, by manipulating the tip T at keyway 50, threads 20 (see FIG. 4A) can be screwed and unscrewed for insertion and removal of the part length rod A.

Finally, a female cylindrical segment 54 has been removed from the cylindrical mass 46. Preferably, this removed section 54 is at the bottom end of keyway 50, at some distance removed from rounded tip 47. As will hereinafter made more apparent, female cylindrical segment 54 enables the tip T to be positively grasped to enable lifting parallel to axis 49 of the entire part length rod A.

Having set forth the construction of the tip, three discrete tools will now be described:

First, and with reference to FIGS. 6, 7A and 7B, a tool including a spring key and male cylindrical segment will be discussed.

Thereafter, and with reference to FIGS. 8, 9A and 9B, a tool which grasps only the periphery of the tip T for both lifting and rotation will be set forth. The reader will understand that this tool will not be utilized where either large lifting forces or large turning or torque forces are required on the partial length rod A.

Finally, and with respect to FIGS. 10A and 10B, a socket for applying a large turning force on the part length rod A will be set forth.

Figure 6:
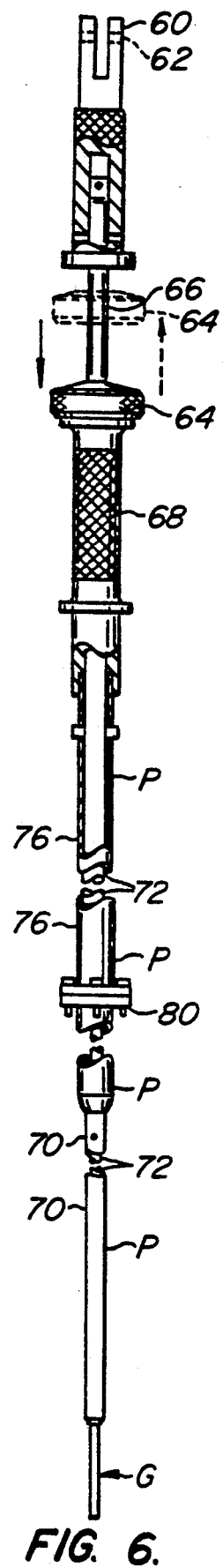
FIG. 6 is a side elevation section of a first embodiment of the grapple shown in FIG. 1 illustrating the upper end of the tool manipulated above the surface, the flange and joint in the central portion of the tool to enable to the tool to be shipped, and the rod and reciprocating tube at the far end of the tool for manipulating the grapple.

Referring to FIG. 6, the pole P utilized with this invention is set forth. Pole P includes an upper cable attachment clevis 60, having a crossbore 62. This clevis 60 at crossbore 62 is conventionally attached to an overhead cable mechanism 14. Utilizing the pendulous weight of pole P and grasping tool G, verticality of the entire pole P arrangement is assured.

It is necessary that pole P have relatively moving parts. These relatively moving parts are utilized for latching and unlatching of the grasping mechanism G. This being the case, and at the top of the pole, there is a knurled knob 64 and a threaded inner rod 66. Knurled knob 64 bears against a knurled handle 68. Handle 68 connects to an outer portion of the pole P.

Looking at the end of the pole adjacent grasping mechanism G, it can be seen that there is required an outer portion of the pole 70, and an inner portion of the pole 72. Further, it will be understood that to operate the grasping mechanism G, relative reciprocation of the members 70, 72 must occur. Accordingly, knurled handle 68 is attached to outer portion 70. Threaded shaft 66 is attached to inner portion 62. By manipulation of handle 68, relative to shaft 66, corresponding movement of outer portion 70 relative to inner portion 72 occurs along the full length of the pole. Accordingly, the grasping mechanism G may be manipulated.

Thirdly, and finally, the reader must realize that the pole P is of considerable length. Not only must the pole penetrate 60" into the radioactive environment of the upwardly exposed fuel bundle, but the pole must pass through a sufficient amount of water so that the maintenance personnel M manipulating the pole P are shielded from the ambient radiation. It thus will be understood that the sheer removal of the maintenance personnel M from the point of manipulation of the part length rod A constitutes one of the difficulties encountered in this invention.

Because of this overall length, it is required to provide for breaking the pole P into two discrete sections. Accordingly, opposed flanges 80 on outer section 70 and a corresponding joining device on inner pole section 72 (not shown) are utilized so that pole P can be shipped in two separate and discrete sections.

Figure 7A:
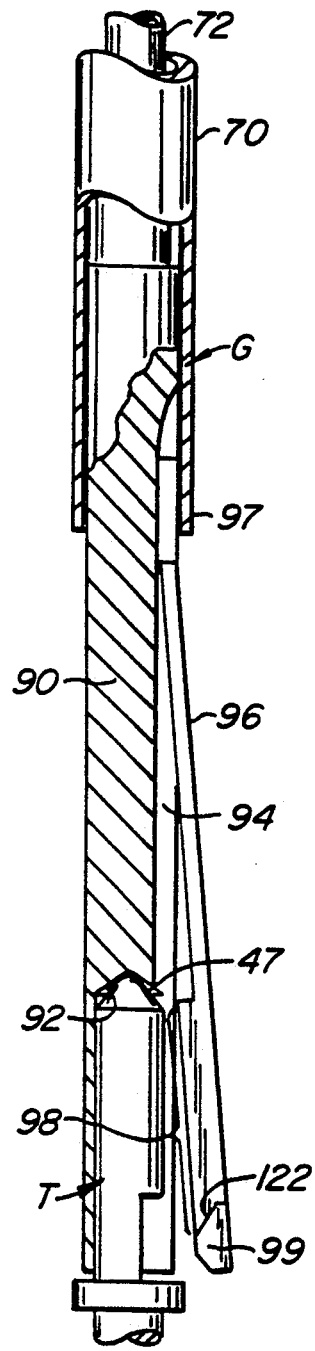
FIG. 7A and 7B are respective perspective views of the grapple and tip with FIG. 7A illustrating the grapple and tip in the act of engagement to the end of the tube and FIG. 7B illustrating grapple and tip engaged with the sleeve locking the assembly in place, it being noted that portions of the sleeve have been broken away for ease of understanding of the drawing.
Figure 7B:
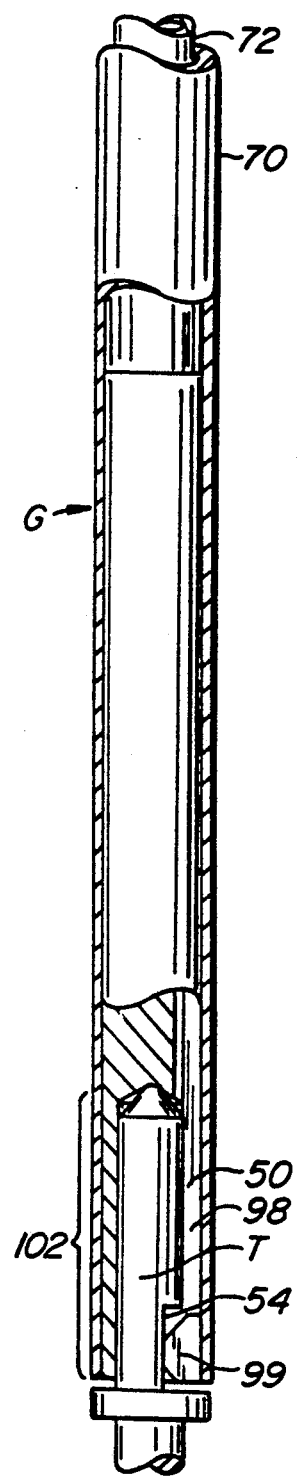

Having set forth the operation of the pole and emphasizing that the outer section 70 reciprocates with respect to the inner section 72, attention may now be devoted to a first embodiment of the grasping tool shown in FIGS. 7A and 7B.

Affixed to shaft 72 there is included a cylinder 90. Cylinder 90 defines a concentric bore 92. Bore 92 is exposed outwardly to and towards tip T, and receives tip T concentrically thereof. Cylinder 92 is provided with an end which mates with taper 47 at the end of tip T.

Cylinder 90 is slotted with a longitudinal keyway 94. It is the function of keyway 94 to receive a spring loaded tang 96.

Spring loaded tang 96 and its attachments can be simply summarized. Tang 96 includes a second thickened end 97 which end 97 forms the weld point to cylinder 90. Tang 96 extends from weld point 97 to a key 98. It is the function of the key 98 to fit into keyway 50. As will hereinafter be described, registry of key 98 to keyway 50 provides a tactile signal to maintenance personnel M manipulating pole P so that rotational registration of gripping mechanism G can be determined at a distance of more than 20011 under conditions where observation of the engagement of the gripping mechanism G to the tip T simply cannot effected.

Finally, and here shown at the distal end of tang 96, there is provided a male cylindrical segment 99. Male cylindrical segment 99 is complementary to female cylindrical segment 54. That is to say, once key 98 registers to keyway 50, and cylinder 90 at bore 92 is fully advanced onto tip T, male cylindrical segment 99 fits into female cylindrical segment 54, to completely fill in the cylindrical profile of the tip T.

It can be seen with respect to FIG. 7A that such engagement is about to occur. By referring to FIG. 7B, locking of the grasping mechanism G can now be set forth.

Referring to grasping mechanism G, it can be seen that outer pole segment 70 is connected to a sleeve section 102. Sleeve section 102 is open, so as to fit over tip T, when tip T has male cylindrical segment 99 occupying female cylindrical segment 54, key 98 occupying keyway 50, and tang 96 fully received within its slot 94.

Having disclosed these constructions, the operation of sleeve 102 to lock to tip T of part length rod A can now be easily understood. With simultaneous reference to FIG. 1A, pole P is manipulated with respect to bundle B at a position overlying the part length rod P. Since the pole P and the grasping mechanism G do not have a dimension exceeding that dimension of an individual cell within spacers S1, S2, lowering of the grasping mechanism G at the end of pole P through spacers S1, S2 at the corresponding cell position easily occurs. When contact is made with tip T, pole P is rotated. At the same time, key 98 is deflected upwardly by gathering surface 47 on tip T.

Rotation of pole P will occur until key 98 registers to keyway 50. At this point, the keyway 50 and key 98 will cause the relative rotation of pole P with respect to part length rod A to suddenly cease. This cessation of rotation will be felt by the maintenance worker M, some distance from fuel bundle B as he stands on catwalk 16.

Once this rotational registration has occurred, grasping mechanism G will be advanced onto tip T. Such advancing will occur until a full position of penetration is reached. At this juncture, female segment 54 on tip T will be occupied by male segment 99. This will be accompanied by an additional tactile indication, which will include the end of the limit of travel of pole P and the grasping mechanism G down onto the top of part length rod A at tip T.

Thereafter, sleeve 102 will be advanced. It will advance to a position overlying tang 96 at key 98 and male cylindrical segment 99. Firm locking of the grasping mechanism G and pole P to the part length rod A will occur.

Typically, the grasping mechanism G will be maintained firmly fixed at tip T during its inspection. Such inspection can include the conventional removal of flocculants and other debris from the exterior of the part length rod A, with visual photographic and other non-destructive examinations occurring to the part length fuel rod A. Presuming that either the part length fuel rod A will be returned to the bundle B or alternately be replaced in bundle B, releasing of the part length rod A must be understood.

It can be seen that male cylindrical segment 99 is provided with a complementary climbing surface 122.

Presuming that sleeve 102 is withdrawn by corresponding withdrawal of outer section 70 of pole P, upward vertical movement of pole P will no longer result in lifting of partial length fuel rod A. Instead, male cylindrical segment 99 will climb free of female cylindrical segment 94, through the coaction of the climbing surface 122 with the edge of the female cylindrical segment. This will cause corresponding lifting of tang 96, enabling complete withdrawal of the grasping mechanism G.

With respect to the apparatus set forth in FIGS. 6, 7A and 7B, the reader will understand that a universal type tool has been disclosed. The disclosed tool provides positive locks to tip T at the end of partial length rod A.

These positive locks include both vertical lifting and application of torque to tip T.

Referring to FIGS. 8, 9A and 9B, a second type of pole P, here denominated P', and gripping mechanism G, here denominated G', is set forth. Referring to FIG. 8, pole P includes clevis 62 overlying two counter-rotating handles 60, 162. Handle 162 is held stationary. Handle 60 is rotated. Upon such rotation, outer member 70 moves longitudinally of pole P with respect to inner member 72. As will hereinafter be explained with more detail, it effects engagement and disengagement of grasping mechanism G'. As before, an opposed flange 80 on outer section 70 and a mechanism (not shown) on inner mechanism 72 enables breaking of the pole P for convenient shipping and/or storage.

Construction of the particular gripping mechanism G' is easy to understand. Inner member 72 has fastened thereto a cylinder 190. Cylinder 190 defines a female bore 192, for receiving the cylindrical portion 46 of tip T at the end of part length rod A. Typically, cylinder 190 is slit. It is slit at three respective cylinder slits 194, at approximate 120° intervals, about an axis 196 of the cylinder.

Additionally, the cylinder side wall is tapered. It tapers from a narrow dimension at the upper end 198 of the cylinder to a thickened dimension 199, at the lower end of the cylinder. Stopping here and ignoring all other constructions, the insertion and removal of cylinder 190 over tip T can be understood. As gripping tool G' comes down onto and over tip T, the respective segments of cylinder 190 will move away from cylinder 46. When it moves away from cylinder 46, capture of the tip T will occur.

The reader can further see that the taper having a thin portion 198 at the upper end of bore 192 and a thickened portion at the lower end 199 of bore 192, will have an advantage in gripping the cylindrical side walls 46 of tip T. Specifically, the cylinder from top to bottom will fit flush with respect to the top to bottom cylindrical side walls of cylinder 46 of tip T.

There remains to be understood how cylinder 190 may be firmly locked to the exterior of tip T.

A second and reciprocating tip 202 is provided. Tip 202 has a thick portion 204 at the upper end, and a thinned portion 206 at the lower end. Sleeve 202, unlike cylinder 190, does not have slits. Accordingly, and once it is advanced over cylinder 190, firm capture of cylinder 190 will occur.

Assuming that cylinder 190 is over the cylindrical portion 196 of tip T, and sleeve 202 is advanced over cylinder 190, firm engagement of the exterior of tip T will occur.

At this point, the reader can note two differences from the mechanism set forth in FIGS. 9A and 9B, with respect to the mechanisms of FIGS. 7A and 7B.

First, and presuming that pole P is utilized to apply torqued partial length rod A at tip T, no positive lock with respect to any keyway will occur. Accordingly, at higher degrees of torque, slippage may be expected. In the ordinary case, and presuming that threads 20 of partial length rod A are not stuck with respect to the lower tie plate, removal of the partial length rod A may occur. However, if sticking occurs, use of another tool may well be desired.

Secondly, no locking of the grip mechanism G' occurs with respect to the female cylindrical cavity 54. Accordingly, if large lifting forces are required, again tool substitution may be utilized.

It will be appreciated that the engagement of the tool mechanism G' shown on FIGS. 9A and 9B is relatively easy. This being the case, and assuming normal attachment of part length rod A in a fuel bundle B, use of this tool will be preferred.

It may be desired to apply just torque to tip T. This being the case, the tool of FIGS. 10A and 10B may well be utilized.

Referring to FIGS. 10A and 10B, a solid tool sleeve 300 is illustrated. Tool sleeve 300 has been slotted at a weld preparation area 302 for the receipt of a key 304. Key 304 is affixed as by welding to slot 302.

Sleeve 300 is conventionally attached to a pole P; relatively reciprocating parts are not required.

In operation, sleeve 300 fits over and receives tip T. Key 304 is registered to keyway 50 in tip T. Rotation under high torque of tip T and attached part length rod A can occur. Such a tool can be used as desired for partial length rod removal.

It is to be noted that the grasping tool arrangements here shown are capable of being conveniently manipulated with respect to the end of a partial length rod A. It will further be understood that absolute verticality of the tip T of the end of the partial length rod A is never required. The respective gathering surfaces and conformance of the various grasping mechanisms G and G' enable the practical operating parameters of a reactor to be accommodated.

What is claimed is:

1. A tool and fuel bundle combination enabling the replacement and removal of a part length fuel rod from a fuel bundle with said tool, said fuel bundle of said combination having:

a matrix of vertically upstanding fuel rods, said fuel rods including full length fuel rods extending substantially the full vertical length of said fuel bundle from a lower tie plate;

at least one part length fuel rod extending less than the full vertical length of said full length fuel rods from said lower tie plate;

a lower tie plate for supporting said fuel rods;

a plurality of spacers placed about said fuel rods, said spacers defining discrete cells surrounding each said fuel rods and contacting said fuel rods to restrain side-to-side movement of each said fuel rods with respect to said remaining fuel rods;

said at least one of said fuel rods being a part length fuel rod having support on said lower tie plate at the lower end and terminating at an upper end underlying at least some but not all of said spacers whereby some spacers surround said part length rods and spacers above said part length rods do not surround said part length rods;

a tip for the end of said part length rod including;

a cylindrical plug having a lower end for attachment to and sealing the upper end of said part length fuel rod;

said cylindrical plug having a diameter less than the cell of said spacers overlying said part length fuel rod;

a longitudinal vertically extending keyway configured within said tip, said vertically extending keyway for permitting rotation of said tip under substantial torque exerted at said keyway;

a tool for the removal and replacement of said part length rod at said tip, said tool of said combination comprising:

an elongate pole having means for grasping said pole at the upper end thereof and means for supporting a working tip grasping tool at the lower end thereof, said pole proximate said tip grasping tool having a diameter less than the diameter of said cells of said spacer overlying the end of said part length rod;

first and second relatively moving members at the lower end of said pole, said first and second relatively moving members operable from the top of said pole to effected relative movement of said members at the bottom of said pole;

a grasping tool suspended from one of said relatively moving members of said pole, said grasping tool including a tip capturing member for movement towards and away from said tip; said tip capturing member when movable toward said tip to engage said tip; said tip capturing member when moveable away from said tip enabling withdrawal of said grasping tool to release said tip;

a tool holding member, said tool holding member defining a longitudinally extending passage for the support of a spring biased member extending within said passage way;

a spring biased member fastened to the upper end of said passage way, extending along said passageway toward the bottom of said tool;

a vertically extending key attached to said spring biased member for movement towards and away from said vertically extending longitudinal keyway from said grasping tool for turning said part length fuel rod;

an exterior sleeve for reciprocating to and from a position overlying said tip immediately over said tip grasping tool, said exterior sleeve attached to the other of said relatively moving members at the bottom of said pole for movement relative to said tip grasping tool;

said sleeve when reciprocated toward said grasping tool preventing relative movement of said tool to release said tip whereby said tip can be locked to said grasping tool.

2. The invention of claim 1 and wherein said tip includes at least one female cylindrical segment removed from said tip to enable raising and lowering of said tip to enable removal and replacement of said part length fuel rod from said fuel bundle at said tip; and, wherein said grasping tool includes;

a male cylinder segment complimentary to said female cylinder segment, said male cylinder segment attached to said spring biased member at a complimentary position overlying said female cylindrical segment whereby said segment can move into and out of said female cylindrical segment for locking and releasing said tip.

* * * * *